Patented Aug. 27, 1935

2,012,267

UNITED STATES PATENT OFFICE 2,012,267

ALKYLENE ESTER OF POLYBASIC ACIDS

Wallace H. Carothers, Wilmington, Del., assignor to E. I. du Pont de Nemours & Company, Wilmington, Del., a corporation of Delaware No Drawing. Application August 1, 1929, Serial No. 382,843

10 Claims. (Cl. 260—8)

This invention relates to a broad class of reactions which I call bi-functional or bi-bifunctional reactions. More particularly it relates to new compositions of matter which result from these reactions.

In various patents on polyhydric alcohol-polybasic acid resins and related materials, the broad claim has been made that resins are formed by the esterification of any polybasic acid by any polyhydric alcohol. This claim is too broad and is apparently founded on mere guess. I have found that the esters formed by the esterification of dibasic acids $HOOC(CH_2)_nCOOH$ with glycols $HO(CH_2)_mOH$, when $n$ and $m$ are integers greater than 1, or in the case of succinic and adipic acids in which they are integers greater than 2, are microcrystalline solids of high molecular weight.

An object of this invention is the preparation of alkylene esters of dibasic acids. A further object is the preparation of new compositions of matter from the reaction of the glycols with carboxylic acids. A further object of the invention is the preparation of materials compatible with pyroxylin, and which may be used as softeners or plasticizers in films or other objects made from this material. A still further object of the invention is the preparation of materials useful as bases in the preparation of pharmaceuticals.

These objects are accomplished by the following invention which consists in the esterification of polybasic acids with glycols.

The preparation of these compounds is carried out by heating a glycol with a dibasic acid, or by heating a glycol with the methyl or ethyl esters of the acid, or by treating the glycol or the sodium derivative of the glycol with the chloride of the acid. In addition, it may be said that certain other methods used in the preparation of simple esters may be here used.

The following examples illustrate the process used.

Example 1

59 g. of succinic acid and 78 g. of trimethylene glycol are heated together in a flask provided with a receiver. The temperature of the bath is kept at 205–210° C. for five hours or until the distillation of water is complete. The flask is then evacuated and heating is continued at 170–240° C. until the distillation of the excess trimethylene glycol is complete. The residue is a viscous liquid which slowly solidifies on cooling. It may be purified by dissolving in chloroform and precipitating with ether.

Example 2

Hexamethylene succinate may be prepared by heating 11.8 g. of succinic acid with 12.4 g. of hexamethylene glycol in a distilling flask provided with a receiver. The temperature of the heating bath is kept at 180–190° C. for two hours or until the distillation of water is complete. The flask is then evacuated and heating is continued at 260–270° C. for one hour. The residue is a viscous liquid which solidifies to a waxy solid on cooling. It may be purified by dissolving in acetone and precipitating with ether.

Example 3

Trimethylene adipate may be prepared by heating 73 g. of adipic acid with 52 g. of trimethylene glycol in a flask provided with a receiver. The heating bath is kept at 180–200° C. for two hours or until the distillation of water is complete. The flask is then evacuated and heating at 200–250° C. is continued until distillation of the trimethylene glycol is complete. The residue is a transparent viscous liquid which solidifies on cooling. It may be purified by dissolving in chloroform and precipitating with methyl alcohol or by dissolving in acetone and precipitating with ether.

Example 4

Hexamethylene adipate may be prepared by heating 14.6 g. of adipic acid with 12.4 g. of hexamethylene glycol in a flask provided with a receiver. The heating bath is kept at 185–210° C. for two hours and the heating is continued for one hour further at 200–220° C. in vacuo. The residue is a viscous liquid which gradually solidifies on cooling. It may be purified by dissolving in acetone and precipitating with ether.

Example 5

In the preparation of ethylene sebacate, 67.3 g. of sebacic acid and 21.7 g. of ethylene glycol are heated together in a flask which is provided with a receiver for the collection of water and is partially immersed in a metal bath. The metal bath is heated to 175–200° C. for three hours. Reaction is made more complete by heating further at 175–200° C. for one hour in vacuo. The residue is a thick, colorless or slightly yellow transparent syrup, which on cooling becomes solid and opaque. It may be purified by crystallization from hot acetone, by precipitation from benzene solution with ether, etc.

Example 6

In the preparation of trimethylene sebacate 40.4 g. of sebacic acid is heated with 45.6 g. of trimethylene glycol in a Claisen flask provided with a receiver. The heating bath is kept at 175° C. for three hours or until the distillation of water ceases. The residue is then heated in vacuo, the temperature of the bath being raised gradually from 150 to 300° C. and heating is continued until the distillation of the excess trimethylene glycol is completed. The residue is a thick viscous liquid which becomes opaque and solid on cooling. It may be purified by dissolving in chloroform and precipitating with petroleum ether.

*Example 7*

Hexamethylene sebacate may be prepared by heating 20.2 g. of sebacic acid and 12.4 g. of hexamethylene glycol in a distilling flask provided with a receiver. The heating is continued with a bath at about 200° C. for two hours or until no more water distills off. The residue is then heated at the same temperature for two hours in vacuo. The residue is a very viscous liquid which on cooling solidifies to an opaque solid mass. It may be purified by dissolving in acetone and precipitating with ether.

As prepared by the methods described above, the alkylene esters of dibasic acids when pure are microcrystalline solids of high molecular weight readily soluble in cold chloroform but insoluble in water, alcohol, ether, and petroleum ether. They are stable toward heat up to 250° C. or above. In the molten state they are very viscous. In the form of solid masses, they vary in properties from brittle porcelain-like material to waxy solids; when isolated by crystallization, they are powders. They are odorless and completely non-volatile. They are compatible with pyroxylin and may be used as softeners or as plasticizers in films or molded subjects made from this material. The alkylene esters of adipic acid when isolated by crystallization are powders which, generally speaking, are softer and have lower melting points than sebacates and succinates.

The methods described in the above examples are designed to make the reaction as complete as possible. Sample preparations by this method show the following melting points:—

|  | °C. |
|---|---|
| Trimethylene succinate | 52 |
| Hexamethylene succinate | 54 |
| Decamethylene succinate | 68 |
| Trimethylene adipate | 45 |
| Hexamethylene adipate | 56 |
| Decamethylene adipate | 77 |
| Ethylene sebacate | 79 |
| Trimethylene sebacate | 56 |
| Decamethylene sebacate | 68 |
| Hexamethylene sebacate | 67 |

The properties of these esters vary with the methods of preparation and the degree of purification. Less complete reaction leads to lower melting points and to products having increased solubility.

It will be apparent that many changes in methods and materials can be made without departing from the scope of the appended claims, and it will be apparent that only a few of the uses of these new compositions of matter have been listed, but it is pointed out that it is intended in this patent to cover every use to which these products are adapted. It is, consequently, to be understood that this invention is not in any way limited to the compositions, uses, or methods specifically set forth except as by the appended claims.

I claim:

1. The method of preparing a microcrystalline polymeric ester of a dibasic acid having the formula $HOOC(CH_2)_nCOOH$ where $n$ is an integer greater than 2 consisting in heating a glycol with said dibasic acid, until distillation of water is complete, in evacuating the vessel, and in heating under such reduced pressure until excess glycol is removed to effect further condensation.

2. The method of preparing a microcrystalline polymetric ester of a dibasic acid having the formula $HOOC(CH_2)_nCOOH$ where $n$ is an integer greater than 2, consisting in heating a glycol with said dibasic acid in a vessel until distillation of water is complete, in evacuating the vessel, in heating under such reduced pressure until excess glycol is removed to effect further condensation and in purifying by dissolving the resulting product in a solvent and in precipitating with ether.

3. The method of preparing a microcrystalline polymeric ester of a dibasic acid consisting in heating a glycol having the formula $$HO(CH_2)_mOH,$$

where $m$ is an integer greater than 2, with said dibasic acid, until distillation of water is complete, in evacuating the vessel, and in heating under such reduced pressure until excess gylcol is removed to effect further condensation.

4. The method of preparing a microcrystalline polymeric ester of a dibasic acid having the formula $HOOC(CH_2)_nCOOH$, where $n$ is an integer greater than 2, consisting in heating a glycol having the formula $HO(CH_2)_mOH$, where $m$ is an integer greater than 2, with said dibasic acid, until distillation of water is complete, in evacuating the vessel, and in heating under such reduced pressure until excess glycol is removed to effect further condensation.

5. The method of preparing a microcrystalline polymeric ester of a dibasic acid having the formula $HOOC(CH_2)_nCOOH$ where $n$ is an integer greater than 2, consisting in heating a glycol with said dibasic acid in a vessel provided with a receiver at a temperature of approximately 250° C. until distillation of water is complete, in evacuating the vessel, in heating between 170–240° C. under such reduced pressure until excess glycol is removed to effect further condensation, in dissolving in chloroform and in precipitating with ether.

6. A microcrystalline product of the reaction of a dibasic acid having the formula $$HOOC(CH_2)_nCOOH$$

with a glycol having the formula $HO(CH_2)_mOH$, in which $n$ is 4 and $m$ is greater than 2 substantially identical with the product of method claim 3 when the same materials are reacted.

7. A microcrystalline product of the reaction of a dibasic acid having the formula $$HOOC(CH_2)_nCOOH$$

with a glycol having the formula $HO(CH_2)_mOH$, in which $n$ is 2 and in which $m$ is greater than 2 substantially identical with the product of method claim 3 when the same materials are reacted.

8. A microcrystalline ester of a dibasic acid having the formula $HOOC(CH_2)_nCOOH$, where $n$ is an integer greater than 2, and a glycol, substantially identical with the product of method claim 2.

9. A microcrystalline ester of a dibasic acid and a glycol having the formula $HO(CH_2)_mOH$ where $m$ is an integer greater than 2 substantially identical with the product of method claim 3.

10. A microcrystalline polymeric ester of a dibasic acid having the formula $$HOOC(CH_2)_nCOOH$$

with a glycol having the formula $HO(CH_2)_mOH$, where $m$ and $n$ are integers greater than 2 substantially identical with the product of method claim 4.

WALLACE H. CAROTHERS.